US012791296B2

United States Patent
Ermigiotti et al.

(10) Patent No.: US 12,791,296 B2
(45) Date of Patent: Nov. 10, 2026

(54) GAUGE FOR IDENTIFYING A WHEEL FASTENER

(71) Applicant: RB Distribution, Inc., Colmar, PA (US)

(72) Inventors: Sean Ermigiotti, Perkasie, PA (US); Alexander Tkach, Pipersville, PA (US); Chris Allebach, Lansdale, PA (US); Devin Swift, Drexel Hill, PA (US); Eric Tryson, Lansdale, PA (US); Jeffrey Martin, Philadelphia, PA (US); Ricardo Llorente Ruiz, Perkasie, PA (US)

(73) Assignee: RB Distribution, Inc., Colmar, PA (US)

( * ) Notice: Subject to any disclaimer, the term of this patent is extended or adjusted under 35 U.S.C. 154(b) by 349 days.

(21) Appl. No.: 18/658,401

(22) Filed: May 8, 2024

(65) Prior Publication Data

US 2024/0377176 A1 Nov. 14, 2024

Related U.S. Application Data

(60) Provisional application No. 63/500,781, filed on May 8, 2023.

(51) Int. Cl.
*G01B 3/34* (2006.01)
*G01B 3/04* (2006.01)
*G01B 5/08* (2006.01)

(52) U.S. Cl.
CPC *G01B 3/04* (2013.01); *G01B 5/08* (2013.01)

(58) Field of Classification Search
CPC ........... G01B 3/14; G01B 3/34; G01B 5/0004
USPC .......................................................... 33/562
See application file for complete search history.

(56) References Cited

U.S. PATENT DOCUMENTS 2,728,145 A 12/1955 Holladay
3,238,629 A * 3/1966 Hurwitz .................... G09F 3/00 356/244
3,858,325 A 1/1975 Goerler
4,138,820 A * 2/1979 O'Connor ................ G01B 3/34 33/562

(Continued)

OTHER PUBLICATIONS

Stainless Nut Bolt Thread Gauge, posted May 18, 2015 [online]. [Retrieved Jul. 31, 2025]. Retrieved from intemet, <https://www.amazon.com/Stainlesstown-Bolt-Screw-Thread-Gauge/dp/B00XUU0UMK?th=1> (May 18, 2015).

(Continued)

*Primary Examiner* — George B Bennett
(74) *Attorney, Agent, or Firm* — Volpe Koenig

(57) ABSTRACT

A gauge for identifying a seat contacting surface configuration of a wheel fastener. The gauge includes a body defining an upper surface and a front face with at least one gauge slot defined in the body. Each gauge slot extends from the top surface and has a circumferential wall extending about a portion thereof with an open area defined in the circumferential wall along the front face and opening into at least a portion of the gauge slot. Each gauge slot including at least a seat portion adjacent the upper surface and defining a seat corresponding with a given seat contacting surface configuration of a wheel fastener. A gauge assembly further including a sizing gauge and a method of identifying a seat contacting surface configuration are further disclosed.

13 Claims, 7 Drawing Sheets

(56) References Cited

U.S. PATENT DOCUMENTS

| | | | | |
|---|---|---|---|---|
| D262,941 | S | 2/1982 | Lorber | |
| 4,730,399 | A * | 3/1988 | Campbell | G01B 5/0025 33/600 |
| 5,131,162 | A * | 7/1992 | Miller | G01B 3/34 33/562 |
| 5,177,874 | A * | 1/1993 | Ogorek | B25B 13/44 33/794 |
| 5,412,878 | A * | 5/1995 | Edman | G01B 5/0025 33/810 |
| 5,548,903 | A * | 8/1996 | Johnson | G01B 3/38 33/679.1 |
| 5,755,323 | A * | 5/1998 | Zahn | B65D 85/58 206/459.5 |
| 6,047,606 | A * | 4/2000 | Sibole | G01B 3/30 73/865.8 |
| D477,989 | S | 8/2003 | Vito | |
| 6,688,015 | B2 * | 2/2004 | Schroeder | F16C 41/04 206/815 |
| 7,509,754 | B2 * | 3/2009 | Hu | G01B 3/166 33/783 |
| 7,607,237 | B2 * | 10/2009 | Schafer | G01B 3/34 33/501.45 |
| 7,877,882 | B2 * | 2/2011 | Burr | G01B 3/48 33/199 R |
| 8,006,405 | B2 * | 8/2011 | Hu | G01B 3/166 33/679.1 |
| 8,220,176 | B2 * | 7/2012 | Loisel | F16B 35/04 33/542 |
| 8,739,444 | B2 * | 6/2014 | Poole | G01B 3/34 283/81 |
| D761,644 | S | 7/2016 | Papafagos | |
| 9,625,246 | B2 * | 4/2017 | Rodriguez | G01B 3/34 |
| 9,689,653 | B2 * | 6/2017 | Baskovic | G01B 3/205 |
| D919,828 | S | 5/2021 | Fishman | |
| D929,218 | S | 8/2021 | Wu | |
| D999,844 | S | 9/2023 | Sprowl et al. | |
| D1,035,467 | S | 7/2024 | Hu | |
| D1,075,957 | S | 5/2025 | Poteet et al. | |
| 2005/0235505 | A1 * | 10/2005 | Joseph | G01B 3/34 33/501.45 |
| 2013/0067753 | A1 | 3/2013 | Diehl | |
| 2024/0353212 | A1 | 10/2024 | Parison et al. | |
| 2024/0377176 | A1 | 11/2024 | Ermigiotti et al. | |

OTHER PUBLICATIONS

Speedway Motors WheelWise 5-Lug Wheel Fitment Tool Center Plate, posted Mar. 7, 2023 [online]. [Retrieved Aug. 5, 2025]. Retrieved from intemet, <https://www.amazon.com/Speedway-Motors-WheelWiseTM-Multiple-Measurement/dp/B0BXQHVSD6> (Mar. 7, 2023).

Thread Checker with All-Metal Board, posted Jun. 22, 2023 [online]. [Retrieved Jul. 31, 2025]. Retrieved from internet, <https:// www.amazon.com/Thread-Checker-Standard-Wall-Mountable-Identifier/dp/B0C8ZN9HZV> (Jun. 22, 2023).

* cited by examiner

GAUGE FOR IDENTIFYING A WHEEL FASTENER

CROSS REFERENCE TO RELATED APPLICATION

This application claims the benefit of U.S. Provisional application No. which was filed on May 8, 2024 and is incorporated by reference as if fully set forth.

BACKGROUND

There are known devices for sizing fasteners, such as nuts and screws. These devices have a shortcoming in that they only address one aspect of the fit. This limitation is problematic when it comes to properly identifying and sizing vehicle wheel fasteners which may have more than one geometric feature.

SUMMARY

Referring to FIGS. 1A-1B, various types and sizes of wheel fasteners 10*a*-10*g* may be utilized to secure a wheel 18 to a wheel hub or the like. Lug nuts 10*a*-10*e* have a body 12*a-e* with a threaded internal bore (not shown) configured to threadably engage a respective wheel stud (not shown) extending from the wheel hub. Each of the bodies 12*a*-12*e* has a seat contacting surface 13*a-e* having a geometric configuration which is intended to match a corresponding seat 22*a-e* defined in the wheel rim 20*a*-20*c*. The lug nuts 10*a*, 10*b* illustrated in FIGS. 1A and 1B have a seat contacting surface 13*a*, 13*b* with a tapered or conical configuration, with the lug nut 10*b* illustrated in FIG. 1B having an extension portion 11 extending beyond the tapered portion. Both of these lug nuts 10*a*, 10*b* are configured to mate with a rim seat 22*a* having a corresponding tapered portion. When the lug nuts 10*a*, 10*b* are tightened, the tapered portions of seat contacting surfaces 13*a*, 13*b* sit flush within the tapered rim seat 22*a* to provide a secure fit, centering and the like. Referring to FIG. 1C, the seat contacting surface 13*c* of lug nut 10*c* has a radius or ball configuration configured to mate with the radius configuration of the rim seat 22*b*. The lug nuts 10*d*, 10*e* illustrated in FIGS. 1D and 1E have a seat contacting surface 13*d*, 13*e* with a flat configuration, with the lug nut 10*e* illustrated in FIG. 1E having a flat washer 14 thereon. Both of these lug nuts 10*d*, 10*e* are configured to mate with a rim seat 22*c* having a corresponding flat configuration.

The lug bolts 10*f* and 10*g* illustrated in FIGS. 1F and 1G are similar to the lug bolts, however, they include a threaded stud 16 extending from the body 12*f*-12*g* configured to engage a threaded bore (not shown) in the wheel hub. Similar to the bolts, each of the lug bolts 10*f*, 10*g* has a seat contacting surface 13*f*, 13*g* of the body 12*f*, 12*g* with a geometric configuration which is intended to match a corresponding seat 22*a*, 22*b* defined in the wheel rim. In the illustrated embodiments, the lug bolt 12*f* has a seat contacting surface 13*f* with a tapered or conical configuration configured to mate with a rim seat 22*a* having a corresponding tapered portion. Referring to FIG. 1G, the seat contacting surface 13*g* of lug bolt 10*g* has a radius or ball configuration configured to mate with the radius configuration of the rim seat 22*b*.

At times, it is necessary to replace a lug nut or lug bolt. If an individual replacing their lug nut/lug bolt does not choose a replacement having a seat contacting surface configuration that corresponds to the configuration of the wheel rim seats of their vehicle, the lug nuts/bolts will not properly sit relative to the rim and such could cause a failure or damage to the vehicle.

DETAILED DESCRIPTION

Figure 4:
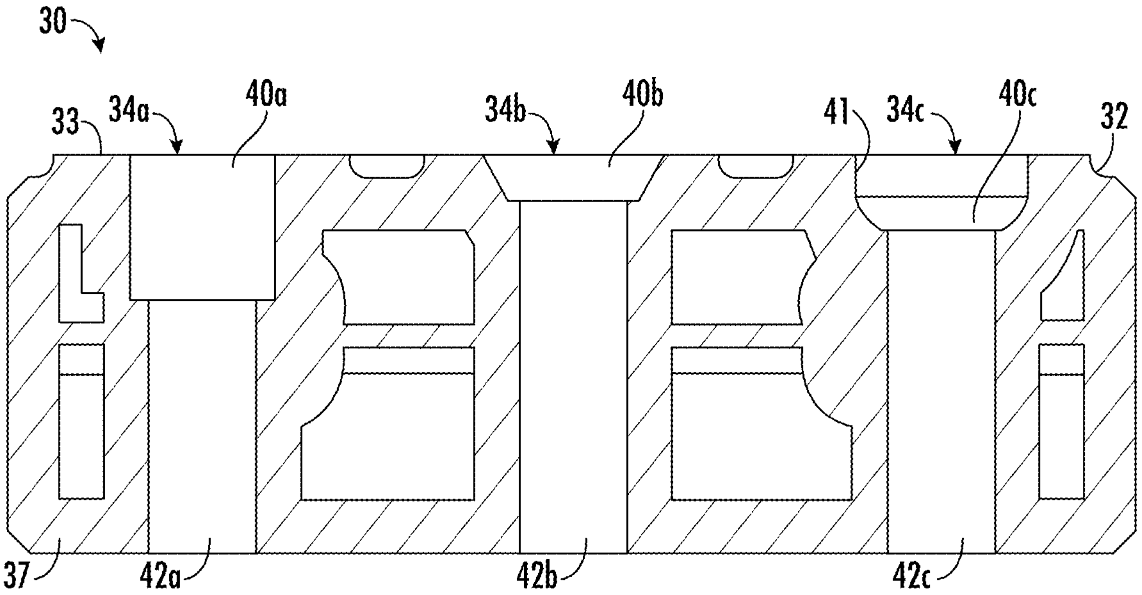
FIG. 4 is a cross-sectional view along the line 4-4 in FIG. 3.
Figure 5:
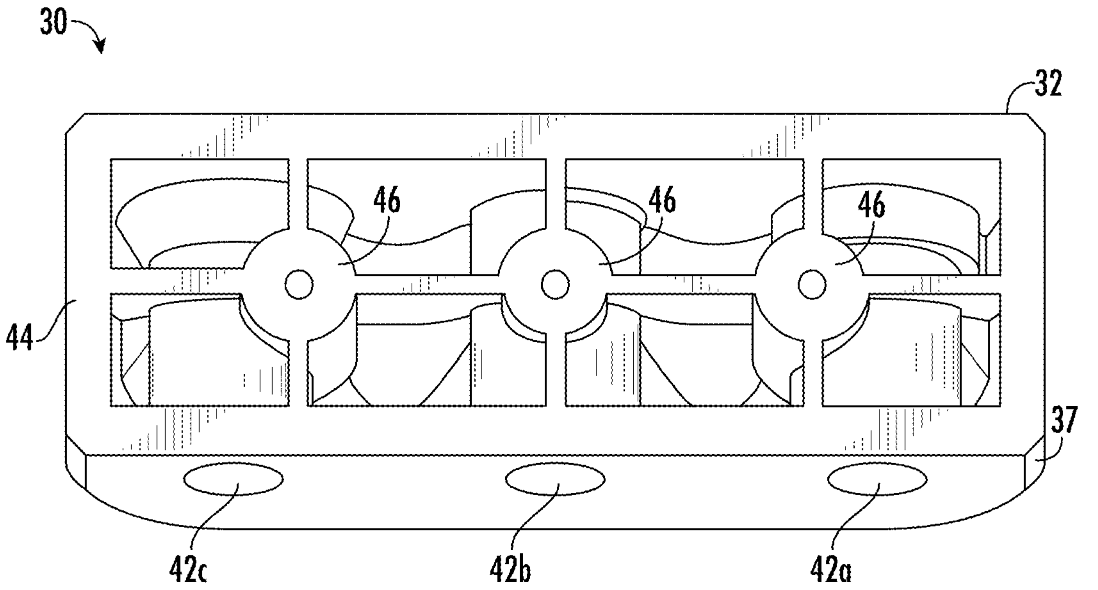
FIG. 5 is a rear perspective view of the gauge in FIG. 2.
Figure 6A:
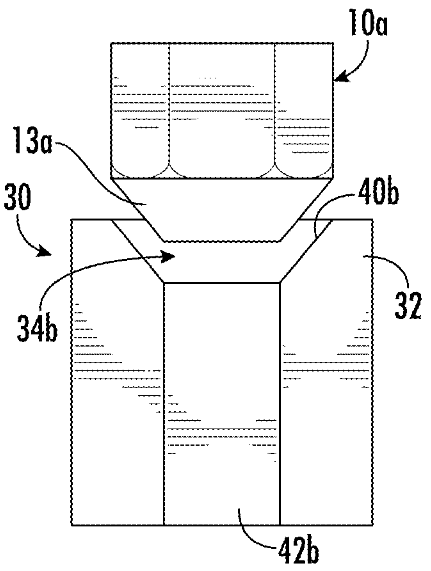
FIGS. 6A and 6B are front views illustrating position of a tapered lag nut relative to a tapered gauge slot.
Figure 6B:
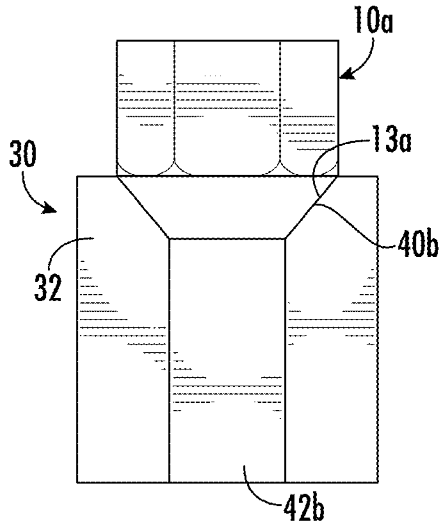

Referring to FIGS. 2-5, a gauge 30 in accordance with an embodiment of the disclosure will be described. The gauge 30 includes a body 32 defining an upper surface 33, a front face 35 and a base 37. A plurality of gauge slots 34*a*-34*c* are defined in the body 32 extending from the upper surface 33. While three gauge slots are shown in the illustrated embodiment, more or fewer may be provided. Each gauge slot 34*a*-34*c* has a circumferential wall 39 defined about a portion thereof, with the front portion having an open area 36*a*-36*c*, such that a user has an unobstructed view into at least the upper portion, adjacent the upper surface 33, of each gauge slot 34*a*-34*c*. As explained in more detail hereinafter, such open area 36*a*-36*c* allows the user to accurately confirm that their lug nut/bolt is of a particular style. Referring to FIG. 5, a rear surface 44 of the body 32 may be provided with mounting holes 46 or the like to facilitate direct mounting of the gauge 30 or attachment of the gauge 30 to a gauge assembly 60, as will be described with reference to FIG. 11.

Figure 9A:
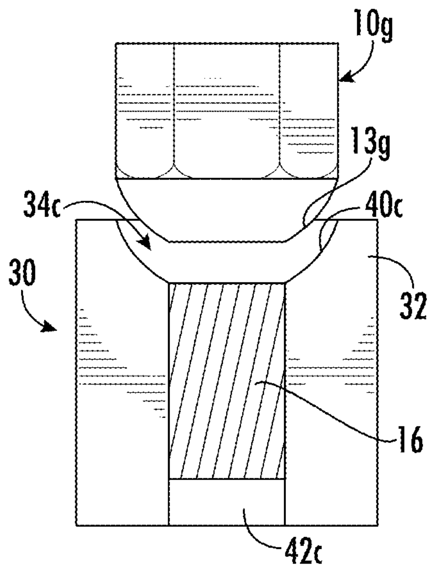
FIGS. 9A and 9B are front views illustrating position of a ball lag bolt relative to a ball gauge slot.
Figure 9B:
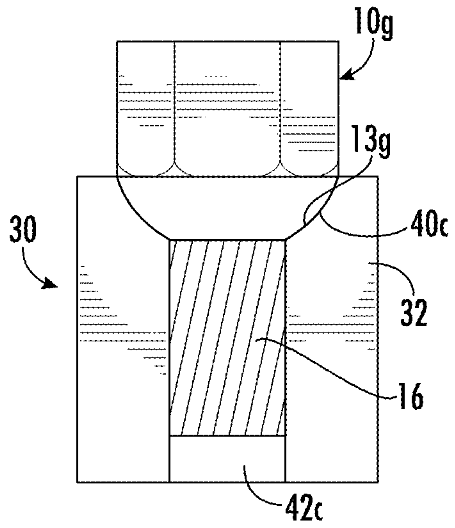

Each gauge slot 34*a*-34*c* generally includes a seat portion 40*a*-40*c* extending from the upper surface 33 and a through bore 42*a*-42*c* extending therefrom into the base 37. In the illustrated embodiment, the through bores 42*a*-42*c* extend through and out of the base 37 although such may not be required. The through bores 42*a*-42*c* are configured to allow the stud 16 of a lug bolt 10*f*, 10*g* or the extension portion 11 of a lug bolt 10*b* to be unobstructed while the seat contacting surface 13*a*-13*g* of the lug nut/bolt is positioned in the seat portion 40*a*-40*c* (see FIGS. 9A and 9B).

Figure 1A:
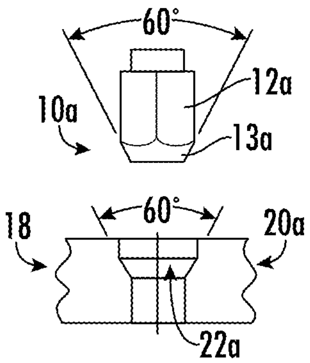
FIG. 1A (PRIOR ART)
FIGS. 1A-1G are front views illustrating different types of wheel fasteners and corresponding wheel rim seats.
Figure 1B:
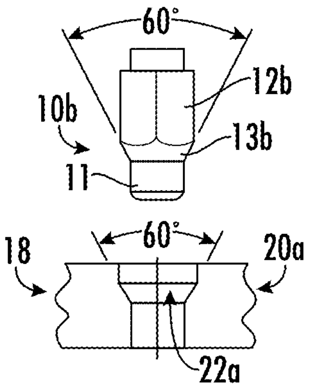
FIG. 1B (PRIOR ART)
Figure 1C:
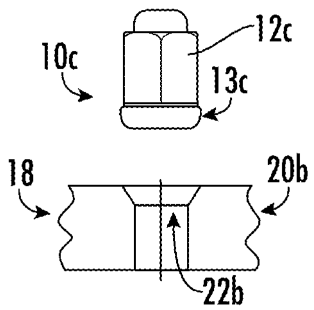
FIG. 1C (PRIOR ART)
Figure 1D:
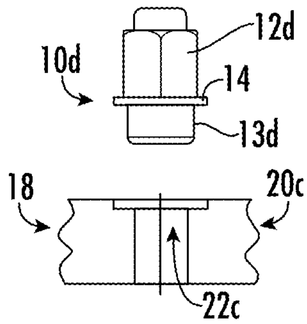
FIG. 1D (PRIOR ART)
Figure 1E:
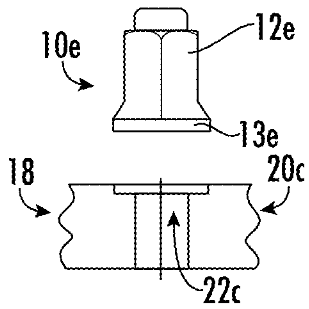
FIG. 1E (PRIOR ART)
Figure 1F:
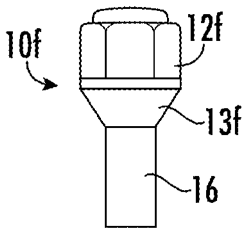
FIG. 1F (PRIOR ART)
Figure 1G:
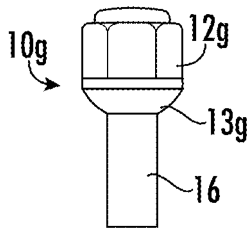
FIG. 1G (PRIOR ART)
Figure 2:
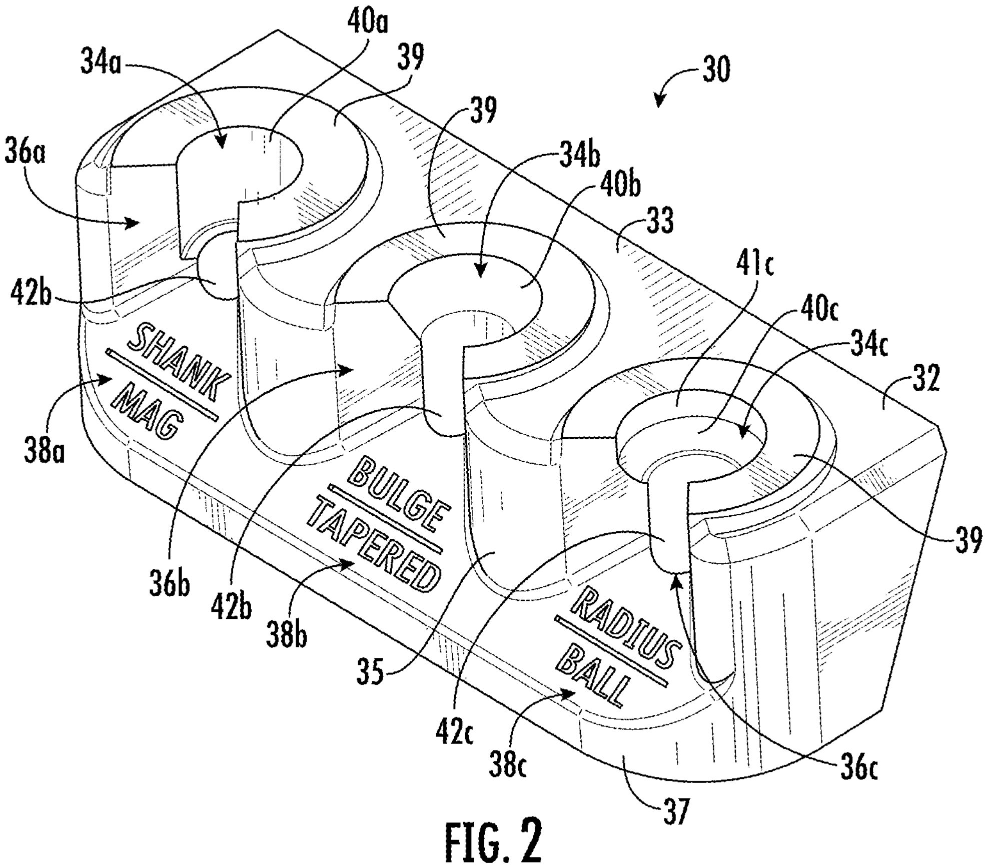
FIG. 2 is a front perspective view of an illustrative gauge for identifying a wheel fastener.
Figure 3:
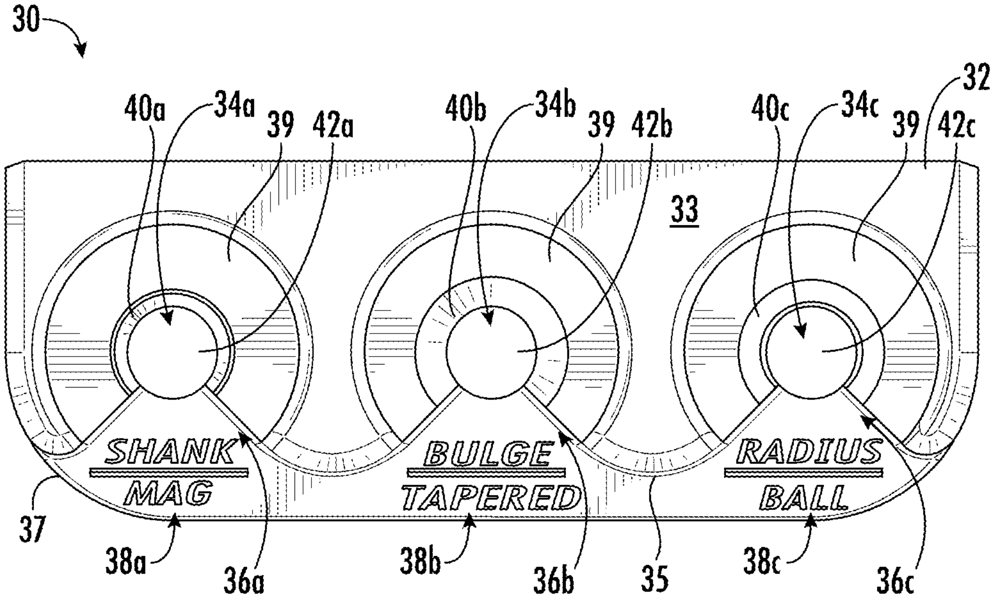
FIG. 3 is a top plan view of the gauge in FIG. 2.

Referring to FIG. 4, the seat portion 40*a*-40*b* of each gauge slot 34*a*-34*c* is configured to receive a lug nut/bolt 10*a*-10*g* with a corresponding configuration. In the illustrated embodiment, the seat portion 40*a* of gauge slot 34*a* has a generally cylindrical configuration with the walls thereof generally perpendicular to the upper surface 33. The seat portion 40*a* is configured to identify lug nuts/bolts having a flat seat contacting surface, for example, as shown in FIGS. 1D and 1E. The seat portion 40*b* of gauge slot 34*b* has a conical surface extending inwardly from the upper surface 33. The seat portion 40*b* is configured to identify lug nuts/bolts having a tapered seat contacting surface, for example, as shown in FIGS. 1A, 1B and 1F. The seat portion 40*c* of gauge slot 34*c* includes a curved portion with a desired radius. As shown, a cylindrical portion 41 may extend between the curved portion and the upper surface 33. The seat portion 40*c* is configured to identify lug nuts/bolts having a radius or ball seat contacting surface, for example, as shown in FIGS. 1C and 1G.

Figure 8:
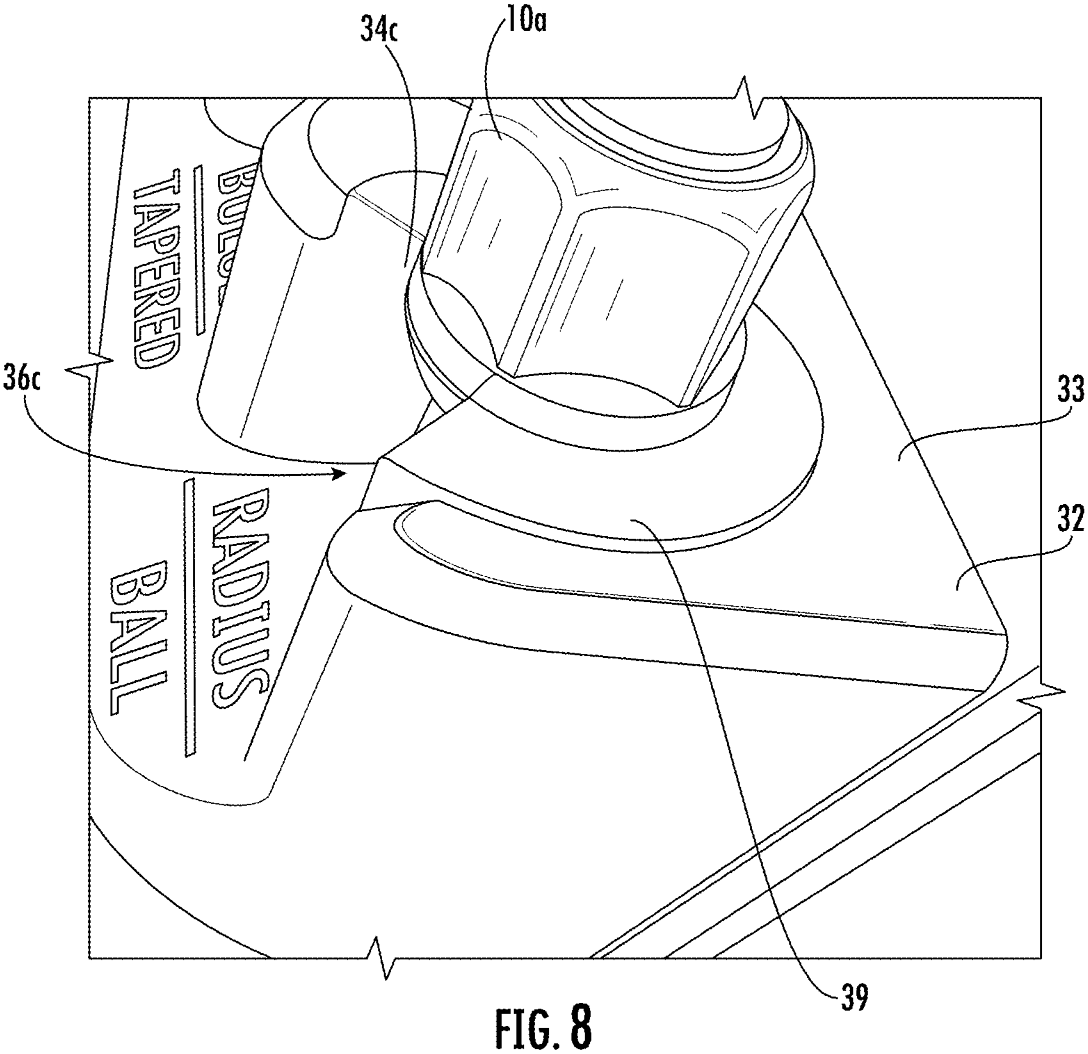
FIG. 8 is a top perspective view illustrating the tapered lag nut positioned in the ball gauge slot.
Figure 10A:
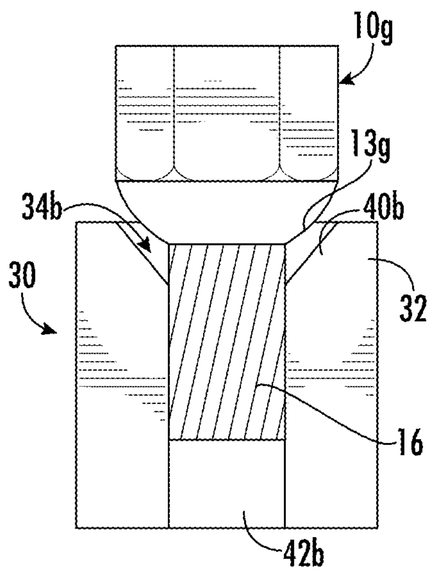
FIGS. 10A and 10B are front views illustrating position of a ball lag bolt relative to a tapered gauge slot.
Figure 10B:
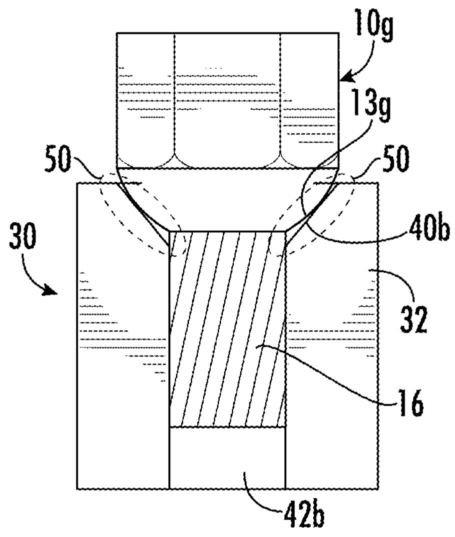

With reference to FIGS. 8 through 10, each position in the gauge 20 has a top opening 26 and a seat 27 that is dimensioned for a specific wheel lug or bolt. The seat 27 is configured to complement the geometric configuration associated with the interior portion of the typically exposed lug fitting for a removal tool. FIG. 8 illustrated the case where a wheel bolt is being verified. In this case, an aperture 28 beneath the seat 27 is dimensions for a specific shaft size associated with the exposed portion of the bolt. The correct thread pattern may be determined by using the female threaded apertures 30-2 and 30-3 in the thread verifier 30. In this configuration, it is also possible to verify a proper length for the shaft by sizing the aperture 28 accordingly.

Figure 7A:
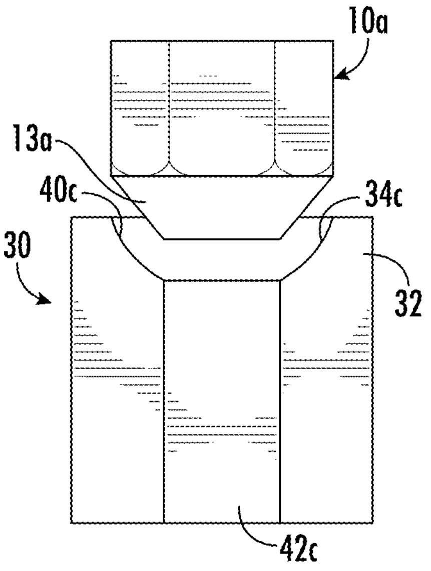
FIGS. 7A and 7B are front views illustrating position of a tapered nut bolt relative to a ball gauge slot.
Figure 7B:
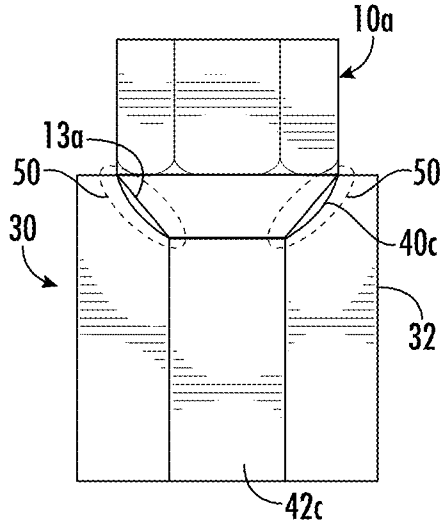

Having described the general structure of the gauge 30 according to an embodiment of the disclosure, use thereof will be described with reference to FIGS. 6A-10B. Turning first to FIGS. 6A-8, a user may determine the configuration of their lug nut/bolt aligning the lug nut/bolt seat contacting surface 13*a*-13*g* with one of the gauge slots 34*a*-34*c* (see FIGS. 6A, 7A, 9A and 10A) and then inserting the seat contacting surface 13*a*-13*g* into the seat portion 40*a*-40*c* as far as it will go (see FIGS. 6A, 7A, 9A and 10A). The user then checks through the open area 36*a*-36*c* to see if the forward face 13*a*-13*g* properly seats in the seat portion 40*a*-40*c*. In the example shown in FIG. 6B, the tapered face 13*a* of the tapered lug nut 10*a* seats properly in seat portion 40*b* of gauge slot 34*b*, however, when positioned in the seat portion 40*c* of gauge slot 34*c*, as shown in FIG. 7B, the forward face 13*a* does not completely seat and gaps 50 exist between the forward face 13*a* and the seat portion 40*c*. It is noted with reference to FIG. 8 that with a gauge only viewed from the top, for example, a gauge without an open front area, the tapered lug nut 10*a* may appear to properly fit in the radius seat portion 40*c* because the radius is larger than the maximum diameter of the taper. However, with the gauge 30 of the present disclosure, the front open area 36*a*-36*c* allows the user to quickly see that the lug nut 10*a* has a tapered configuration, not a radius or ball configuration. With the example shown in FIGS. 9B and 10B, the ball lug bolt 13*g* seats completely within the radius seat portion 40*c* of gauge slot 34*c*, but does not fit entirely within or seat properly in the tapered seat portion 40*b* of gauge slot 34*b*. The same result would happen if a tapered or balled seat contacting surface is positioned in the flat seat portion 40*a* of gauge slot 34*a*. Once the proper lug nut/bolt configuration is identified, the user can then confidently shop for a replacement part having the same configuration.

Figure 11:
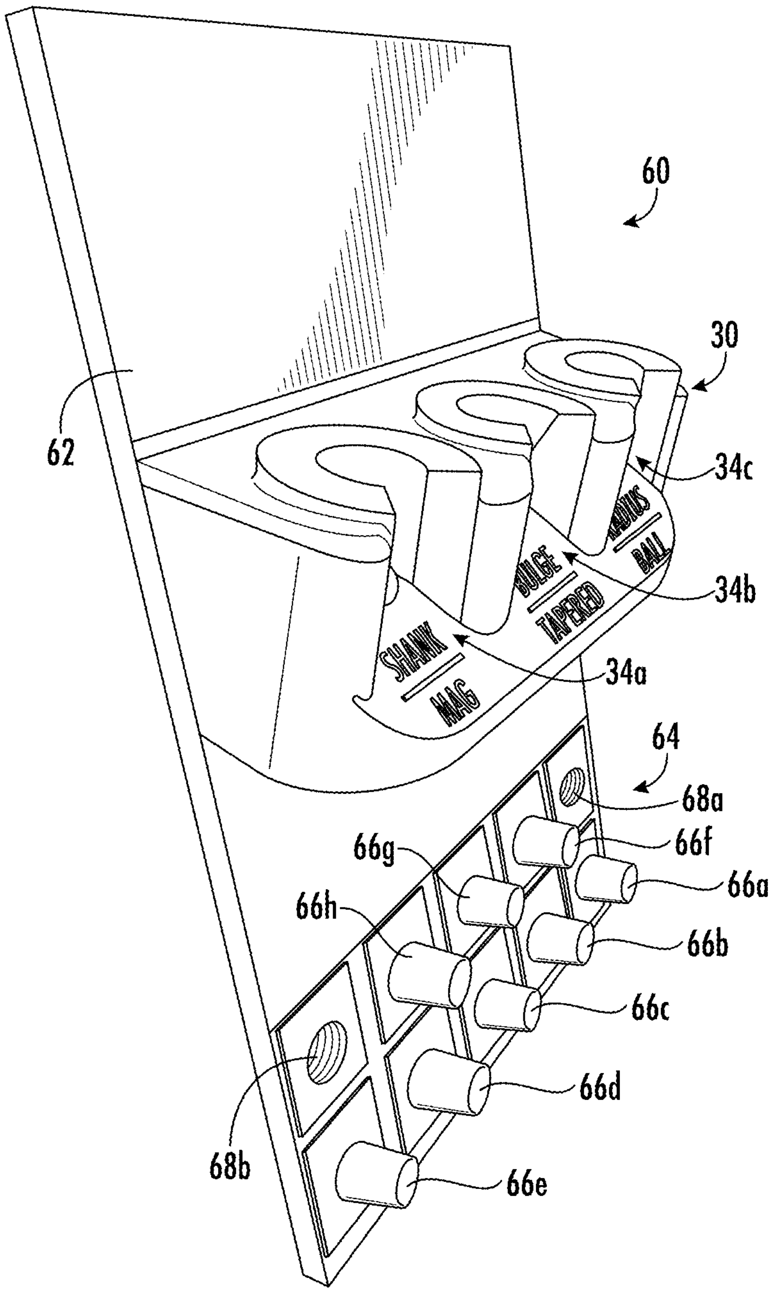
FIG. 11 is a perspective view of a gauging assembly including the gauge for identifying a wheel fastener as illustrated in FIG. 2 and a sizing gauge.

Referring to FIG. 11, the gauge 20 may be included in a larger gauge assembly 60. The gauge assembly 60 includes a support board 62 onto which the gauge 30 is attached, for example, via the mounting holes 46. Additionally, a sizing gauge 64 is also secured to the board 62. The sizing gauge 64 includes a plurality of threaded studs 66*a*-66*h* having varying diameters, and/or thread pitches and a plurality of threaded bores 68*a*-68*b* having different diameters and/or thread pitches. A user can utilize the threaded studs 66*a*-66*h* to determine the proper thread sizing of their lug nut or utilize the threaded bores 68*a*-68*b* to determine the proper thread sizing of their lug bolts.

What is claimed is:

1. A gauge for identifying a seat contacting surface configuration of a wheel fastener, the gauge comprising:
   a body defining an upper surface and a front face with at least one gauge slot defined in the body; each gauge slot extending from the top surface and having a circumferential wall extending about a portion thereof with an open area defined in the circumferential wall along the front face and opening into at least a portion of the gauge slot;
   the gauge slot including at least a seat portion adjacent the upper surface and defining a seat corresponding with a given seat contacting surface configuration of a wheel fastener.

2. The gauge according to claim 1 wherein the body defines at least two gauge slots and the seat portion of each of the gauge slots defines a seat corresponding with a different one of the given seat contacting surface configurations of a wheel fastener.

3. The gauge according to claim 2 wherein the given seat contacting surface configurations are selected from a group including a flat configuration, a tapered configuration and a radius configuration.

4. The gauge according to claim 1 wherein the body defines at least three gauge slots and the seat portion of each of the gauge slots defines a seat corresponding with a different one of the given seat contacting surface configurations of a wheel fastener.

5. The gauge according to claim 4 wherein the given front end configurations are selected from a group including a flat configuration, a tapered configuration and a radius configuration.

6. The gauge according to claim 1 wherein the wheel fastener is a lug nut.

7. The gauge according to claim 1 wherein each gauge slot further includes a through bore extending from the respective seat portion.

8. The gauge according to claim 7 wherein the wheel fastener is a lug nut or a lug bolt.

9. A gauge assembly comprising:
   a support board;
   a gauge according to claim 1 secured to the support board; and
   a sizing gauge including a plurality of threaded studs, the threaded studs having different diameters and/or thread pitches.

10. The gauge assembly according to claim 9 wherein the sizing gauge further includes a plurality of threaded bores, the threaded bores having different diameters and/or thread pitches.

11. A method of identifying a seat contacting surface configuration of a wheel fastener, the method comprising:
   a. positioning a seat contacting surface of the wheel fastener in the seat portion of a first of the gauge slots of the gauge according to claim 2;
   b. observing the wheel fastener seat contacting surface in the seat portion of the first of the gauge slots through the open area;
   c. determining if the wheel fastener seat contacting surface properly seats in the seat portion of the first of the gauge slots; and
   d. if the wheel fastener seat contacting surface does not properly seat in the seat portion of the first of the gauge slots, repeating steps a-c in another of the gauge slots.

12. A gauge for sizing a wheel fastener, the gauge comprising:

a body having a predetermined geometric configuration that includes a top surface, a front surface, a back surface, and at least one fastener gauge;

the top surface includes an aperture with a seat dimensioned to receive a fastener with a specific geometric configuration;

the front surface has an opening that exposes a fastener positioned in the seat;

whereby a properly sized fastener can be determined by visual inspection of the fastener within the gauge.

13. The fastener of claim 12, wherein an aperture beneath the seat is dimensioned to receive a shaft associated with a fastener and determine whether a shaft is of a proper size for a fastener application.

* * * * *